United States Patent
Ziehm, Jr. et al.

[15] 3,698,700
[45] Oct. 17, 1972

[54] QUENCHING APPARATUS FOR EXTRUDED ARTICLES

[72] Inventors: Kurt F. Ziehm, Jr., Lantana, Fla.; James E. Markiewicz, Roselle, Ill.

[73] Assignee: Precision Extrusions, Inc., Bensenville, Ill.

[22] Filed: Dec. 8, 1970

[21] Appl. No.: 96,119

[52] U.S. Cl. ...................... 266/6 S, 148/13, 148/143
[51] Int. Cl. ............................................... C21d 1/62
[58] Field of Search ............ 266/6 S, 8, 4 A, 4 S, 3 R, 266/67, 70, 71, 73; 148/143, 144, 145, 12.4, 13, 140, 153; 164/281, 282, 283; 226/67, 70, 71, 73; 198/179

[56] References Cited

UNITED STATES PATENTS

| | | |
|---|---|---|
| 3,303,062 | 2/1967 | Clumpner.................266/6 S |
| 1,088,171 | 2/1914 | Pehrson..................164/282 X |
| 3,546,911 | 12/1970 | Lenz.........................266/6 S |

*Primary Examiner*—J. Spencer Overholser
*Assistant Examiner*—John S. Brown
*Attorney*—Johnston, Root, O'Keeffe, Keil, Thompson & Shurtleff

[57] ABSTRACT

An apparatus for quenching elongated extruded metal products is provided in which the metal products are extruded directly into an elongated open ended, open bottom enclosure in which a wall of coolant is formed and wherein the construction is such that a puller for said elongated extruded metal products can engage the end of such products immediately adjacent the extrusion die and can move through said enclosure while maintaining a seal for preventing escape of the coolant during such movement.

6 Claims, 6 Drawing Figures

PATENTED OCT 17 1972
3,698,700
SHEET 1 OF 2
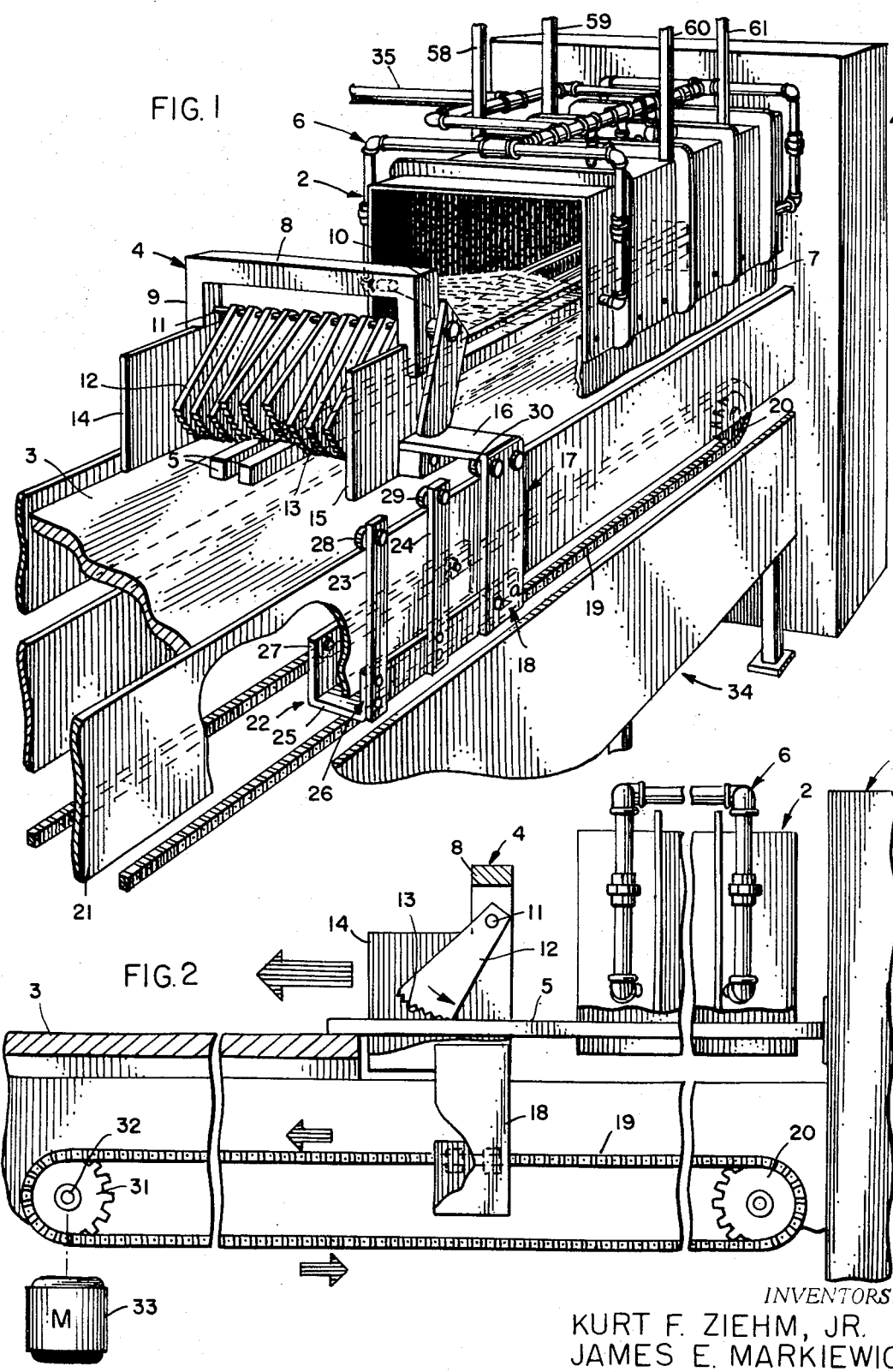
INVENTORS:
KURT F. ZIEHM, JR.
JAMES E. MARKIEWICZ
BY: Johnston, Root, O'Keeffe, Keil, Thompson & Shurtleff
ATT'YS

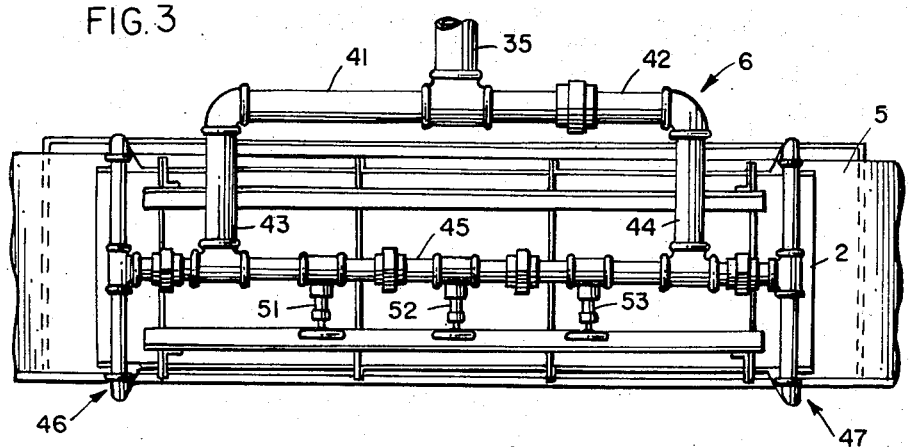
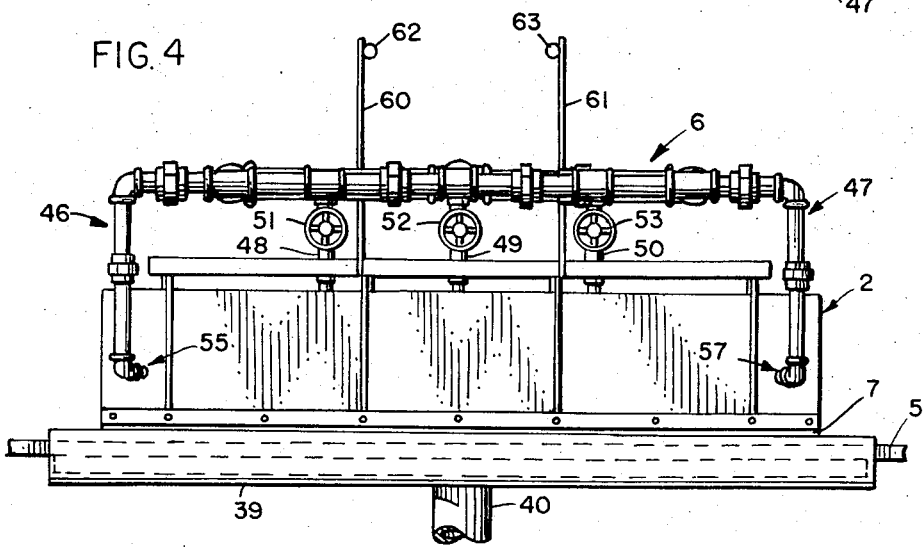
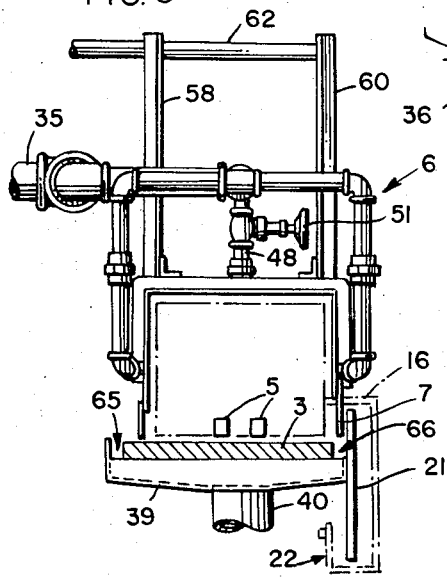
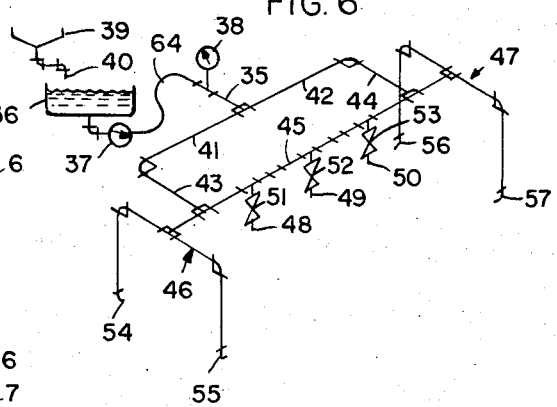

3,698,700

QUENCHING APPARATUS FOR EXTRUDED ARTICLES

BACKGROUND

One of the problems encountered in extruding articles at high temperatures is the proper cooling of such articles after they leave the extrusion die. Obviously, may different types of cooling methods can be used such as air or fan cooling and quenching in a liquid coolant. Among the liquid coolant methods are dip quenching, waterwall quenching and pressure spraying. In dip quenching the hot extruded article is broken loose from the form die and as quickly as possible dropped into a tank of liquid coolant such as water. One disadvantage is the manpower required to get the extrusion in and out of the quench tank. Several men are required to handle the hot long section of extruded articles. Furthermore, in the period of time required to remove the extrusion from the press the front end of the article is cooled to a lower temperature than the back end. Also, in may cases where the article is made of metal, the metal cools so much before immersion that it is not possible to consistently obtain satisfactory properties after ageing. In addition, thin wall extrusions and hollow shapes are susceptible to high degrees of distortion when dropped into water because of uneven cooling. Expensive straightening operations are usually required.

In a waterwall quench where the hot extrusion is directed into a long rectangular box immediately after it exits from the extrusion die, one problem heretofore has been the difficulty in threading the extrusion through the box.

When the pressure spray method is used other problems are encountered. The method is not always very effective and the apparatus required to generate the necessary pressures adds to the cost of the operation.

OBJECTS

One of the objects of the present invention is to provide a new and improved waterwall type system for quenching hot extruded articles in which a puller can be used with the system by gripping the extruded article immediately after it exits from the extrusion die and pulling it the full length of a table, thereby avoiding any loss of time or any loss of a portion of the extruded article due to difficulties in threading or guiding the extrusion through the quenching medium.

Another object is to provide a quenching apparatus in which the quenching enclosure can readily be removed from the runout table when not in use.

Still another object is to provide a quenching apparatus in which adjustable nozzles can be used to direct flow of a liquid coolant, if desired, even though this may not be absolutely necessary with this system.

Still a further object is to provide an apparatus of the type described in which adjusting valves and pressure gauges can be used to control flow of a liquid coolant.

A further object is to provide an apparatus of the type described in which the coolant can be recirculated and used over again.

An additional object is to provide a quenching apparatus in which heavier shapes can be cooled which otherwise would require a dip quench thereby saving time and obtaining less distortion than in a case where a dip quench is used.

Still another object is to provide a quenching apparatus of the type described which is less expensive to produce and maintain than pressure spray type equipment since there is no need for high pressure pumps or spray nozzles.

BRIEF DESCRIPTION OF THE DRAWINGS

Other objects and advantages will appear by reference to the following description in conjunction with the accompanying drawings in which FIG. 1 is a perspective view of one type of apparatus provided in accordance with the invention;

FIG. 2 is a side view with parts broken away and partly diagrammatic of the apparatus shown in FIG. 1;

FIG. 3 is a top view of a portion of the apparatus shown in FIG. 1;

FIG. 4 is a side view of a portion of the apparatus shown in FIG. 1;

FIG. 5 is an end view of a portion of the apparatus shown in FIG. 1, looking toward the extrusion press, and FIG. 6 is diagrammatic arrangement of the catch-all basin, reservoir, valves, pipes and pressure gauges.

BRIEF SUMMARY OF THE INVENTION

The invention provides an apparatus for quenching elongated hot extruded products comprising:
  a. an elongated open ended, open bottom enclosure mounted with one open end immediately adjacent the orifice of an extrusion die;
  b. a table beneath said open bottom of said enclosure;
  c. means for introducing a liquid coolant into said enclosure;
  d. a catch basin for said liquid beneath said table;
  e. a puller for said elongated extruded metal products mounted within said enclosure over said table and adapted to grip one end of an elongated extruded metal product adjacent said extrusion die;
  f. motive means for moving said puller longitudinally over said table, and
  g. a seal associated with said enclosure and said motive means for preventing escape of said liquid during the longitudinal movement of said puller away from said extrusion die.

This apparatus is especially useful for quenching aluminum, aluminum alloys, copper, copper alloys, and other extruded metal articles but can also be used for quenching articles made form synthetic resins or polymers, or any other type of articles where quenching is necessary or desirable. The coolant employed is normally water and the temperature of the coolant is usually around 70° to 90° F. The coolant can also contain dissolved salts, acids or alkalis, or it can contain corrosion and scale inhibitors. If desired, various liquid organic coolants, for example, polyethylene glycols, or the like, can be used, either alone or in conjunction with water.

DETAILED DESCRIPTION OF THE INVENTION

Referring to Fig. 1, the extrusion press generally illustrated at 1 is disposed immediately adjacent an elongated open ended, open bottom enclosure generally indicated at 2. The arrangement is such that one open end of the enclosure 2 is immediately adjacent the orifice of an extrusion die, not shown. The table 3 is disposed beneath said open bottom of said enclosure. A puller generally indicated at 4 is disposed above said table 3 and is adapted to grip the extruded articles 5 as they come from the orifice of the extrusion die. Liquid coolant is supplied to the interior of enclosure 2 from a piping arrangement generally indicated at 6.

On one side of enclosure 2 a seal 7 of flexible sheet material which should also be water resistant and heat resistant, for a a flexible sheet material made from asbestos, is provided to permit the longitudinal movement of the puller through said enclosure while preventing escape of the liquid coolant during such movement.

As shown, the puller 4 has a top member 8 with dependent sides 9 and 10 which support a shaft 11 on which are pivotally mounted a plurality of gripping devices 12 which are in the form of segments having toothed lower edges 13 which engage the end of the extruded article as it emerges from the orifice of the extrusion die. It should be understood that the puller itself is not a part of this invention except to the extent that it forms a part of the combination as a whole.

The puller also contains side plates 14 and 15 and the side plate 15 is connected to an arm 16 of a bracket member generally indicated at 17. The bracket member 17 is fastened at its lower end 18 to an endless conveyor chain 19 which passes over a sprocket 20. The side member 21 serves as a guide for the longitudinal movement of the puller 4.

As illustrated the member 17 is connected to a trough-like member 22 to which is also connected upwardly extending arms 23 and 24. The trough-like member 22 has a bottom portion 25 and sides 26 and 27 which partially surround the undersides of member 21. Roller members 28, 29 and 30 engage the top of member 21 and thereby facilitate the longitudinal movement and guidance of puller 4.

As illustrated in FIG. 2, endless chain 19 travels on sprockets 20 and 31, the sprocket 31 being fixed to a shaft 32 which is driven by a motor 33.

The previously described assembly is supported by a frame generally indicated at 34. Referring to FIG. 3 to 6, the piping arrangement 6 consists of an inlet pipe 35 connected at one end to a reservoir 36 through a pump 37. Pipe 35 is also provided with a pressure gauge 38. Reservoir 36 receives liquid coolant from a catch basin 39 provided with a drain pipe 40. Additional liquid coolant can be added to reservoir 36 as required in any suitable manner.

Pipe 35 is connected to pipes 41 and 42 which in turn are connected to pipes 43 and 44. Pipes 43 and 44 are connected to pipe 45 which is the main feeder pipe to the end pipe generally indicated at 46 and 47 and also to intermediate pipes 48, 49 and 50 controlled by valves 51, 52 and 53. The pipes indicated at 46 provide for the introduction of liquid coolant into the enclosure 2 through outlets 54 and 55 and the pipes indicated at 47 provide for the introduction of liquid coolant into enclosure 2 through outlets 56 and 57. Pipes 48, 49 and 50 have outlets which introduce liquid coolant into the upper part of enclosure 2. Each of the aforesaid outlets is equipped with a suitable nozzle adapted to direct the liquid coolant toward the extruded article to be cooled.

Enclosure 2 is supported by supports 58, 59, 60 and 61 which in turn are supported from slide members 62 and 63. The entire enclosure unit including the piping can therefore be moved away from the table 3. This is facilitated by connecting the main supply pipe 35 to the reservoir 36 through a flexible conduit or hose 64 (Fig. 6). Of course, in order to effect this lateral movement of the enclosure 2 and the associated piping, it is essential to move the puller 6 out of the enclosure and the lateral movement of the whole unit must be to the left in the direction of the arrow as illustrated in Fig. 5. Otherwise, the motive means for moving the puller longitudinally over the table would interfere with the lateral movement of the enclosure and its associated piping.

MODE OF OPERATION

In operation, the puller 4 is moved into the enclosure 2 until the members 12 can grip the end of the extruded piece as it leaves the orifice of the extrusion die. The pump 37 is started and motor is started, thereby causing puller 4 to pull the extruded piece 5 through a wall of water over table 3. As puller 4 advances arm 16 moves against seal 7 and pushes it inwardly while still permitting seal 7 to prevent escape of the liquid coolant during the longitudinal movement of the puller away from the extrusion die. As puller 4 moves out of enclosure 2, the quenching process continues with a wall of water being formed around the extruded article. The puller continues to the end of the table which may be of any suitable length, for example, from 50 to 100 feet, and after the puller has reached a predetermined destination the extruded article by that time has been completely quenched and the other end not attached to the puller is lying on the table outside of the enclosure 2 from which position it can be removed in any suitable manner.

The liquid coolant which falls to the bottom of the enclosure 2 overflows the table at the edges 65 and 66 into catch basin 39 from which it flows through pipe 49 to reservoir 36 and then can be recirculated through the hookup shown in Fig. 6.

The operation of the apparatus is subject to some variation depending upon the particular extruded article to be quenched. Thus, for an extruded aluminum article, e.g., a shaped aluminum bar, which has a temperature of 950° to 1,050° F. as it leaves the extrusion die, suitable quenching can be obtained by 58 water under a 58 foot head at 350 gallons per minute or 50 gallons per minute per nozzle. The water can be at a temperature of say 70° to 90° F. and the amount can vary depending upon the size of the extruded article. This is essentially a low pressure operation as contrasted with high pressure spray quenching.

A very important advantage of the invention resides in the fact that the puller maintains tension on the extrusion throughout the quenching so as to prevent distortion. The same puller can be used with this system for the full length of the table. Hence, there is no loss of time or extrusion length due to guiding the extrusion through the quenching enclosure. Adjustable nozzles can be used to direct flow of the coolant, if desired, although they are not required with this system. Likewise, adjusting valves and pressure gauges can be used to control the flow. Recirculation of the liquid coolant is a cost saving as compared with spray methods now in operation. Heavier shapes can be cooled during the extrusion process which heretofore have required a dip quench, thereby affording a saving in time and loss distortion as compared with the dip quench. The initial cost of the apparatus and the maintenance is less than the costs involved with pressure sprays since there is no need for high pressure pumps or special nozzles. A further advantage is that the quenching enclosure with associated pipes can easily be removed by means of a slide mechanism from the runout table when not in use.

The invention is hereby claimed as follows:

1. Apparatus for quenching elongated hot extruded products comprising:
   a. an elongated open ended, open bottom enclosure mounted with one open end immediately adjacent the orifice of an extrusion die,
   b. a table beneath said open bottom of said enclosure,
   c. means for introducing a liquid coolant into said enclosure,
   d. a catch basin for said liquid beneath said table,
   e. a puller for said elongated extruded metal products mounted within said enclosure over said table and adapted to grip one end of an elongated extruded metal product adjacent said extrusion die,
   f. motive means for moving said puller longitudinally over said table,
   g. a seal associated with said enclosure and said motive means for preventing escape of said liquid during the longitudinal movement of said puller away from said extrusion die, and
   h. means for moving said enclosure and the components connected thereto away from said table.

2. An apparatus as claimed in claim 1 in which (c) comprises means for introducing a liquid coolant to the interior of said enclosure from opposite side of said enclosure to form a water wall around the extruded product.

3. An apparatus as claimed in claim 2 which comprises means for introducing a liquid coolant from the top of said enclosure to the interior thereof.

4. An apparatus as claimed in claim 1 in which (d) comprises means for catching liquid overflowing the sides of said table.

5. An apparatus as claimed in claim 1 which comprises means for transferring said liquid coolant from said catch basin to a reservoir and means for returning said liquid coolant from said reservoir to said enclosure.

6. Apparatus for quenching elongated hot extruded products comprising:
   a. an elongated open ended, open bottom enclosure mounted with one open end immediately adjacent the orifice of an extrusion die,
   b. a table beneath said open bottom of said enclosure,
   c. means for introducing a liquid coolant into said enclosure,
   d. a catch basin for said liquid beneath said table,
   e. a puller for said elongated extruded metal products mounted within said enclosure over said table and adapted to grip one end of an elongated extruded metal product adjacent said extrusion die,
   f. motive means for moving said puller longitudinally over said table comprising an inwardly extending arm, and
   g. a seal associated with said enclosure and said motive means for preventing escape of said liquid during the longitudinal movement of said puller away from said extrusion die comprising a flexible, water resistant and heat resistant sheet material depending downwardly from one side of said enclosure on said side of said table, the lower part of said sheet material being in contact with said arm of (f) as said puller moves through said enclosure and forming a seal to prevent the escape of said liquid.

* * * * *

UNITED STATES PATENT OFFICE
CERTIFICATE OF CORRECTION

Patent No. 3,698,700     Dated October 17, 1972

Inventor(s) Kurt F. Ziehm Jr., James E. Markewicz

It is certified that error appears in the above-identified patent and that said Letters Patent are hereby corrected as shown below:

Column 1, line 8,
"may" should read -- many --

Column 3, line 11,
"for a a" should read -- for example, a --

Column 4, line 22,
"motor is" should read -- motor 33 is --

Column 4, line 50,
"58" should read -- pumping --

Signed and sealed this 15th day of May 1973.

(SEAL)
Attest:

EDWARD M. FLETCHER, JR.
Attesting Officer

ROBERT GOTTSCHALK
Commissioner of Patents